April 29, 1958 M. J. BINCKLEY 2,832,153
LAYOUT APPARATUS FOR WELDED OFFSETS
Filed June 27, 1956 2 Sheets-Sheet 1
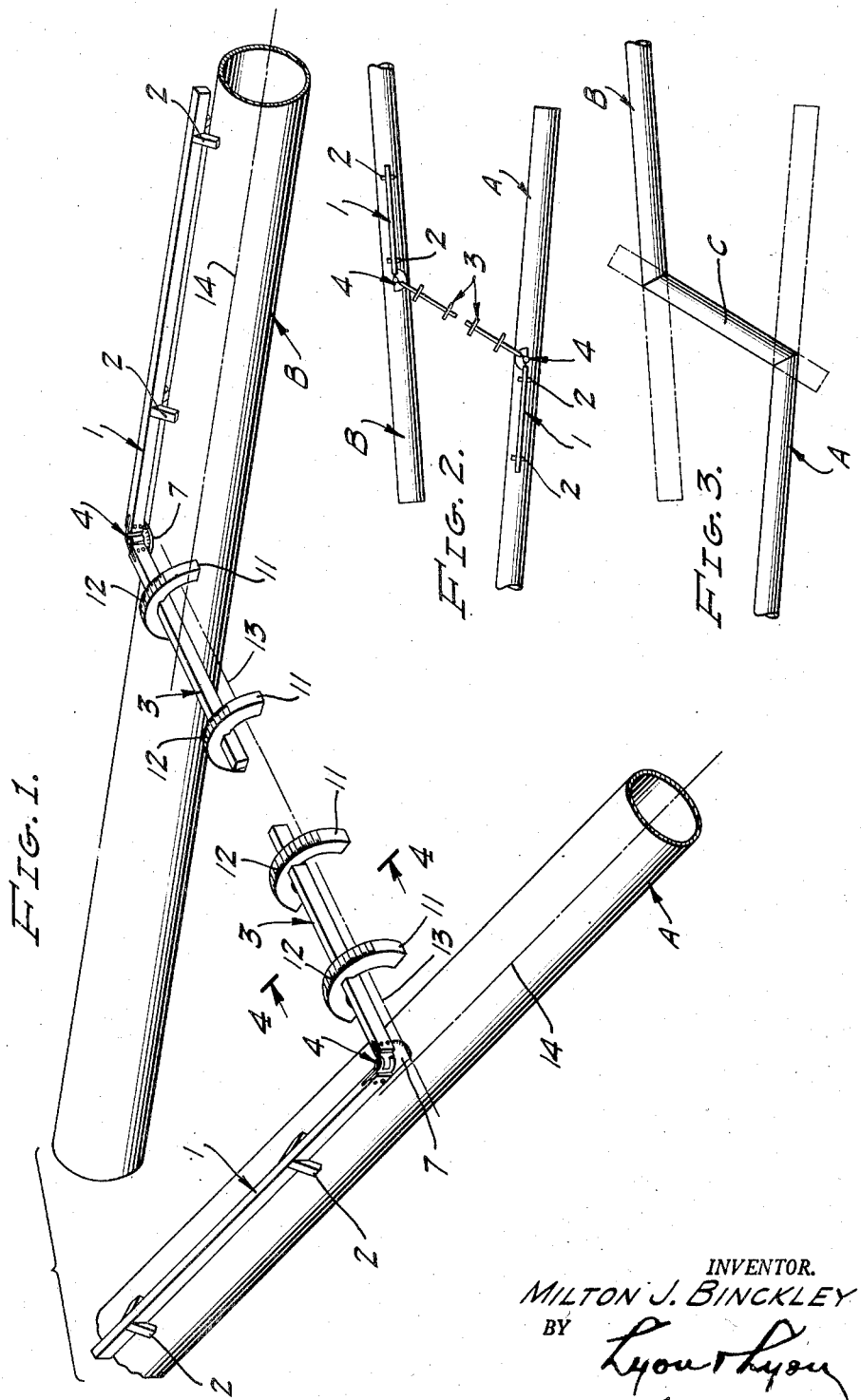
INVENTOR.
MILTON J. BINCKLEY
BY
ATTORNEYS.

April 29, 1958 M. J. BINCKLEY 2,832,153
LAYOUT APPARATUS FOR WELDED OFFSETS
Filed June 27, 1956 2 Sheets-Sheet 2

INVENTOR.
MILTON J. BINCKLEY
BY Lyon & Lyon
ATTORNEYS.

United States Patent Office 2,832,153
Patented Apr. 29, 1958

2,832,153

LAYOUT APPARATUS FOR WELDED OFFSETS

Milton J. Binckley, Los Angeles, Calif., assignor to Southern California Gas Company, Los Angeles, Calif., a corporation of California Application June 27, 1956, Serial No. 594,314

4 Claims. (Cl. 33—180)

This invention relates to layout apparatus for welded offsets; that is, to apparatus for determining the angles and orientations of cuts to be made in offset pipe lines, which are to be joined by a connecting section welded therebetween.

Included in the objects of this invention are:

First, to provide a layout apparatus which is particularly useful when it is necessary to join two pipe lines that have no common plane and therefore must be joined by a compound offset.

Second, to provide a layout apparatus which may be used in the field to mark and measure the angular relation of the pipes to be joined and the pipe section intended to connect them.

Third, to provide a layout apparatus which is particularly useful in connecting pipe lines of large diameter.

With the above and other objects in view, as may appear hereinafter, reference is directed to the accompanying drawings in which:

Figure 1 is a fragmentary view showing a pair of angularly related pipe sections intended to be interconnected, and showing the layout apparatus disposed thereon;

Fig. 2 is a reduced substantially diagrammatical plan view thereof;

Fig. 3 is a substantially diagrammatical plan view showing the two pipe sections connected together, and indicating by broken lines the severed portions of the pipe sections and connecting section;

Figure 4:
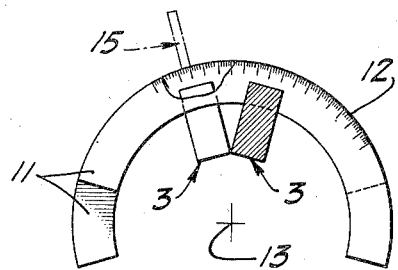
Fig. 4 is a sectional view through 4—4 of Fig. 1, showing the arm members and their arch elements in position to define a common axis.

The layout apparatus is provided with a pair of saddle bars 1. Each saddle bar is equipped near each end with a pair of diverging feet 2. Each saddle bar is supported by its feet on one of two pipe sections A or B which are intended to be joined. The saddle bars 1 may be moved longitudinally as well as circumferentially, but for all positions define planes passing through the axes of their respective pipe sections.

A pivoted arm 3 is provided for each saddle bar 1. The arms 3 and saddle bars 1 are joined by hinge means 4. Each hinge means is provided with a tubular hinge pin 5 adapted to form a guide for a center punch 6.

Secured to each saddle bar 1 is a protractor plate 7 having a center coinciding with the axis of the hinge means 4. The periphery of each protractor plate is provided with a protractor scale 8.

Each pivoted arm may be provided with an aperture 9 exposing a section of the protractor scale. The aperture may be provided with a plastic or glass window having a reference mark 10 thereon cooperating with the protractor scale 8, so that the angular position of each pivoted arm 3 relative to its saddle bar 1 may be accurately measured.

Removably mounted on each pivoted arm 3 is a pair of semicircular arch elements 11. The arch elements may be notched so as to be located in a predetermined position on their respective arms 3. Each arch element carries a protractor scale 12. Several sets of arch elements are provided, each corresponding to a particular diameter of pipe, with the result that the pair of arch elements on each arm 3 defines an axis line 13 which intersects the axis line 14 of the corresponding pipe section A or B.

Figure 5:
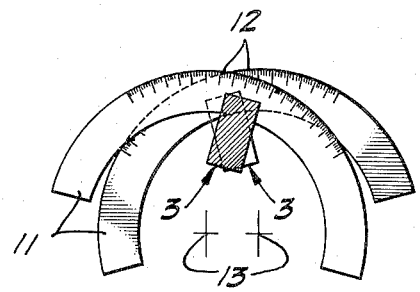
Fig. 5 is a similar sectional view showing these members displaced.
Figure 6:
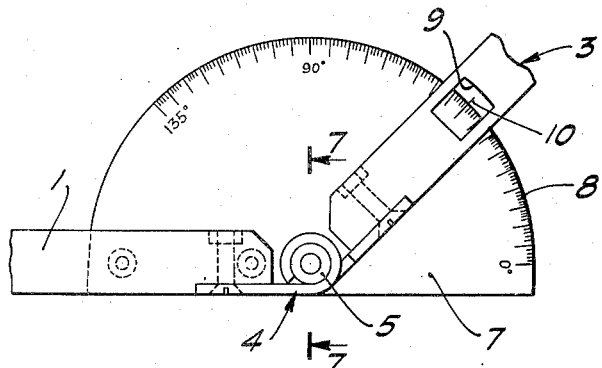
Fig. 6 is an enlarged fragmentary plan view showing one of the hinged connections and the protractor provided at the juncture of one of the saddle members and its arm.
Figure 7:
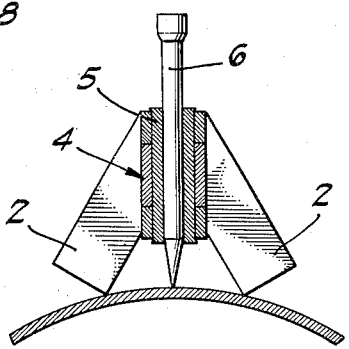
Fig. 7 is an enlarged fragmentary sectional view through 7—7 of Fig. 6 showing the center punch for marking one of the pipe sections.

Operation of the layout apparatus is as follows:

The two saddle bars 1 are positioned on the corresponding pipe sections A and B and are adjusted longitudinally as well as circumferentially until the cylindrical surfaces of the arch elements 11 of the two arms 3 are in alignment, that is, define a common cylinder. When so positioned the axis lines of the two sets of arch elements 11 coincide, as indicated in Fig. 4. In another adjustment of the saddle bars 1 and pivoted arms 3, the axis lines 13 will not coincide, as indicated in Fig. 5.

Figure 8:
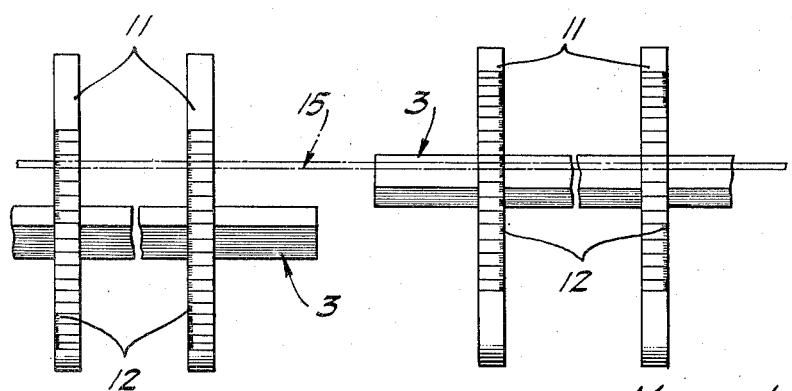
Fig. 8 is a fragmentary plan view of the arm members and their arch elements shown in position to define a common axis.

Alignment of the arch elements 11 may be facilitated by use of a straight edge 15 indicated by broken lines in Figs. 4 and 8. When the arch elements have been aligned so that their axis lines 13 coincide, the resulting single axis line extends between and intersects the axes 14 of the two pipe sections A and B. When this is accomplished, the relative circumference of the arch elements 11 of the two arms 3 may be measured by use of the straight edge 15 and the protractor scales 12. Also the angular relation of each arm 3 and its saddle bar 1 may be measured by the protractor scale 8.

When the correct position of the two portions of the layout apparatus has been established, the pipe sections A and B are marked by the center punch 6, which is moved axially through the axis of each of the hinge means 4. The point thus established on each pipe section locates a point through which the pipe section should be cut. The angle at which the pipe section should be cut is one-half the reading of the corresponding protractor scale 8. Once the reading of the protractor scale is known and the center punch mark has been made, it is a simple matter to mark the pipe circumferentially by other tools, not shown, but well known in the field of pipe line welding.

The data obtained from the layout apparatus not only determines the points at which the pipe sections should be cut, but also is available to mark and cut the connecting section C, indicated in Fig. 3. The length of the section C is determined by measuring the distance between the two punch marks on the pipe sections A and B.

While a particular embodiment of this invention has been shown and described, it is not intended to limit the same to the exact details of the construction set forth, and it embraces such changes, modifications, and equivalents of the parts and their formation and arrangement as come within the purview of the appended claims.

What is claimed is:

1. A layout apparatus for welded offsets, comprising: a member adapted to be adjustably mounted parallel to the axis of each of a pair of pipe sections to be joined; an arm hinged to each member; arch elements having loci defining a line intersecting the axis of the corresponding pipe section mounted on each arm; said members being movable on their respective pipe sections to bring the arch elements into coaxial relation; means for measuring the relative circumferential displacement of the arch elements on said arms; means for measuring the angular relations of said arms and members; and means for marking the positions of said members on said pipe sections.

2. A layout apparatus for welded offsets, comprising: a member adapted to be adjustably mounted parallel to the axis of each of a pair of pipe sections to be joined; an arm hinged to each member; means for disposing said arms in planes passing through a common line intersecting the axes of said pipe sections; means for measuring relative circumferential displacement of said arms; means for measuring the angular relation of each arm and the corresponding member; and means for marking on each of said pipe sections a point lying on the axis of the connection between each arm and the corresponding member.

3. A layout apparatus for welded offsets, comprising: a saddle member having spaced feet for supporting a member on a cylindrical surface in parallelism with the axis thereof, one of said saddle members adapted to be adjustably mounted on each of a pair of pipe sections to be joined; an arm hinged to each saddle member and adapted to be pointed toward the other pipe section, said saddle members being adjustable on their respective pipe sections until planes passing through the axes of said arms intersect a common line passing through the axes of both said pipe sections; means for measuring relative circumferential displacement of said arms; coacting protractor and reference means carried by each saddle member and its corresponding arm to measure the angular relation therebetween; and means for marking said pipe sections at points in predetermined relation to the line joining the axes of said pipe sections.

4. A layout apparatus for welded offsets, comprising: a saddle member having spaced feet for supporting a member on a cylindrical surface in parallelism with the axis thereof, one of said saddle members adapted to be adjustably mounted on each of a pair of pipe sections to be joined; an arm for each saddle member; a hinge means joining each arm and saddle member; means for marking on the respective pipe section a point lying on a radius line passing through each hinge means; said saddle members being adjustable axially and circumferentially on their respective pipe sections to bring said arms into a position wherein planes passing through said arms intersect a common line passing through the axes of both of said pipe sections; means for measuring the relative circumferential displacement of said arms; and means for measuring the angular relation of each saddle member and its arm.

References Cited in the file of this patent

UNITED STATES PATENTS

| 1,520,143 | Sandell | Dec. 23, 1924 |
| 1,590,499 | Cozad | June 29, 1926 |
| 1,848,527 | Hickey | Mar. 8, 1932 |
| 2,516,854 | Christian | Aug. 1, 1950 |

FOREIGN PATENTS

| 546,658 | Great Britain | July 23, 1942 |